(12) United States Patent
Iida

(10) Patent No.: US 11,724,550 B2
(45) Date of Patent: Aug. 15, 2023

(54) PNEUMATIC TIRE

(71) Applicant: The Yokohama Rubber Co., LTD., Tokyo (JP)

(72) Inventor: Takahiro Iida, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 268 days.

(21) Appl. No.: 16/765,855

(22) PCT Filed: Nov. 16, 2018

(86) PCT No.: PCT/JP2018/042381
§ 371 (c)(1),
(2) Date: May 20, 2020

(87) PCT Pub. No.: WO2019/098307
PCT Pub. Date: May 23, 2019

(65) Prior Publication Data
US 2020/0361245 A1 Nov. 19, 2020

(30) Foreign Application Priority Data
Nov. 20, 2017 (JP) .............................. JP2017-222527

(51) Int. Cl.
*B60C 11/12* (2006.01)
*B60C 11/03* (2006.01)

(52) U.S. Cl.
CPC ...... *B60C 11/1236* (2013.01); *B60C 11/0306* (2013.01); *B60C 11/1259* (2013.01); *B60C 11/1272* (2013.01)

(58) Field of Classification Search
CPC .. B60C 11/12; B60C 11/1204; B60C 11/1236
See application file for complete search history.

(56) References Cited

U.S. PATENT DOCUMENTS

2010/0116393 A1   5/2010   Miyazaki
2010/0263775 A1  10/2010   Watanabe
(Continued)

FOREIGN PATENT DOCUMENTS

CN   102555682 A   7/2012
CN   203805639     9/2014
(Continued)

OTHER PUBLICATIONS

International Search Report for International Application No. PCT/JP2018/042381 dated Feb. 5, 2019, 4 pages, Japan.

*Primary Examiner* — Cedrick S Williams
(74) *Attorney, Agent, or Firm* — Thorpe North & Western

(57) ABSTRACT

The tread pattern of the pneumatic tire includes an outer main groove, shoulder lug grooves, and vertical sipes. The outer main groove extends in the tire circumferential direction on an outer side of the tire centerline in the tire width direction. The shoulder lug grooves are spaced apart in the tire circumferential direction and provided in the shoulder land portion regions on an outer side of the outer main groove in the tire width direction, extend from the outer side in the tire width direction toward the outer main groove, are closed in a shoulder land portion region. Each of the vertical sipes has a narrower width than each of the shoulder lug grooves, crosses each of the shoulder lug grooves and extends in the tire circumferential direction. Each of the vertical sipes has a depth greater than a groove depth of each of the shoulder lug grooves.

19 Claims, 5 Drawing Sheets

(56) References Cited

U.S. PATENT DOCUMENTS

| | | | |
|---|---|---|---|
| 2011/0024012 A1 | 2/2011 | Iwai | |
| 2011/0041972 A1 | 2/2011 | Kageyama | |
| 2011/0297284 A1* | 12/2011 | Montesello | B60C 11/0309 |
| | | | 152/209.8 |
| 2012/0145295 A1 | 6/2012 | Yamada | |
| 2014/0290815 A1 | 10/2014 | Tomida | |
| 2015/0273951 A1 | 10/2015 | Yamakawa | |
| 2015/0298508 A1* | 10/2015 | Yamakawa | B60C 11/1236 |
| | | | 152/209.21 |
| 2017/0190222 A1 | 7/2017 | Suzuki | |
| 2017/0361659 A1* | 12/2017 | Yamakawa | B60C 11/12 |
| 2018/0056728 A1 | 3/2018 | Yamakawa | |
| 2018/0319219 A1* | 11/2018 | Oba | B60C 11/0302 |

FOREIGN PATENT DOCUMENTS

| | | | | |
|---|---|---|---|---|
| CN | 106068192 | | 11/2016 | |
| DE | 10 2010 003 779 | | 10/2010 | |
| EP | 2 281 698 | | 2/2011 | |
| JP | 11091315 A | * | 4/1999 | |
| JP | 2000-052715 | | 2/2000 | |
| JP | 2003154813 A | * | 5/2003 | B60C 11/033 |
| JP | 2010-111358 | | 5/2010 | |
| JP | 2011-042328 | | 3/2011 | |
| JP | 2013-071633 | | 4/2013 | |
| JP | 2014088116 A | * | 5/2014 | |
| JP | 2014-205410 | | 10/2014 | |
| JP | 2016-022800 | | 2/2016 | |
| WO | WO 2014/136883 | | 9/2014 | |
| WO | WO 2015/167006 | | 11/2015 | |
| WO | WO 2016/024593 | | 2/2016 | |
| WO | WO 2016/143477 | | 9/2016 | |

* cited by examiner

PNEUMATIC TIRE

TECHNICAL FIELD

The present technology relates to a pneumatic tire.

BACKGROUND ART

A typical method of improving wet performance of the tire is to ensure drainage properties by forming main grooves extending in the tire circumferential direction as well as lug grooves extending in the tire width direction in the tread surface of tires and thus increasing groove area ratio. However, in such a method, there is a problem in that the rigidity of the land portion formed in the tread surface is reduced, so steering stability is likely to be deteriorated.

In the related art, in tires in which main grooves and lug grooves are formed, for example, a tread pattern is known in which one end of a lug groove is connected to a main groove and the other end is closed in a region of the land portion (see Japan Unexamined Patent Publication No. 2013-071633). It is conceivable that in tires including a lug groove with such a form, drainage properties are ensured, and a reduction in the rigidity of the land portion is suppressed compared to a tire in which both ends of the lug grooves are connected to the main grooves, and wet performance and steering stability may be achieved at a certain level.

However, various tire performance is required for tires mounted on commercial vehicles used for transporting and the like of packages and passengers. For example, tires mounted on commercial vehicles that frequently travel on an express highway are required to have steering stability when traveling at high speeds. In addition, for example, tires mounted on commercial vehicles used for home delivery and the like in urban areas are required to have steering stability when traveling at high speed on a winding arterial roads connecting cities. On the other hand, steering stability on wet road surfaces (wet steering stability) is also required.

However, in the tread pattern described above having a form in which one end of the lug grooves is connected to the main groove and the other end is closed in the region of the land portion, steering stability when traveling at high speeds (high-speed steering stability) is insufficient, and there is a risk that wet steering stability may decline.

SUMMARY

The present technology provides a pneumatic tire capable of improving high-speed steering stability and suppressing a decrease in wet steering stability.

An aspect of the present technology is a pneumatic tire including a tread portion provided with a tread pattern.

The tread pattern includes an outer main groove extending in a tire circumferential direction on an outer side of the tire center line in a tire width direction, a plurality of shoulder lug grooves each spaced apart in the tire circumferential direction and provided in a shoulder land portion region on an outer side of the outer main groove in the tire width direction, extending from the outer side in the tire width direction toward the outer main groove and closed in the shoulder land portion region, and a plurality of vertical sipes each having a narrower width than each of the shoulder lug grooves, and extending in the tire circumferential direction, crossing each of the shoulder lug grooves, and each of the vertical sipes having a depth greater than a groove depth of each of the shoulder lug grooves.

Each of the vertical sipes is preferably arranged along the tire circumferential direction being discontinued between adjacent respective shoulder lug grooves.

Preferably, the tread pattern does not include the shoulder lug groove that connect to the outer main groove in the shoulder land portion region.

Preferably, the tread pattern preferably does not include the sipe that connect the closed ends of the shoulder lug grooves with the outer main groove.

Preferably the tread pattern further includes a plurality of shoulder sipes each spaced apart in the tire circumferential direction and provided in the shoulder land portion region and extending crossing between discontinued each of the vertical sipes that are discontinued.

Preferably the sipe width of each of the vertical sipes is greater than the sipe width of each of the shoulder sipes.

Preferably, the tread pattern further includes an inner main groove provided on an inner side of the outer main groove in the tire width direction spaced apart from the outer main groove, and extending in the tire circumferential direction, a plurality of lug grooves with sipes each formed of a lug groove and a first sipe in an inner land portion region between the outer main groove and the inner main groove, the lug groove extending from the outer main groove toward the inner main groove and closing within the inner land portion region, and the first sipe further extending from the lug groove toward the inner main groove, each of the lug grooves with sipes being arranged in the inner land portion region spaced apart in the tire circumferential direction and extending penetrating through the inner land portion region, and a plurality of second sipes each arranged alternately in the tire circumferential direction with each of the lug grooves with sipes spaced apart in the tire circumferential direction in the inner land portion region and extending penetrating through the inner land portion region and extending penetrating through the inner land portion region. Each of the lug grooves with sipes extends at an incline with respect to the tire width direction, each of the second sipes extends at an incline with respect to the tire width direction to a direction opposite to a direction in the tire circumferential direction where each of the lug grooves with sipes is inclined, in the inner land portion region, a plurality of substantially triangular blocks each surrounded by the outer main groove, each of the lug grooves with sipes, and each of the second sipes are arranged side by side in the tire circumferential direction, each of the shoulder sipes is connected to the outer main groove, and an opening positions of each of the shoulder sips into the outer main groove is located within a range in between both ends in the tire circumferential direction where a portion of each of the substantially triangular blocks contacting the outer main groove is located.

Preferably, each of the shoulder lug grooves include a portion where the groove depth decreases continuously or stepwisely shallower from the outer side in the tire width direction toward the outer main groove, and the sipe depth of each of the vertical sipes is greater than the groove depth of each of the shoulder lug grooves at position where each of the vertical sipes crosses each of the shoulder lug grooves.

Preferably, in a cross section including a rotation axis of the pneumatic tire, each of the vertical sipes extends linearly in a depth direction.

Preferably, a closed end of each of the shoulder lug grooves is separated from the outer main groove by 5 mm or greater.

Preferably, a spacing s between the vertical sipes adjacent in the tire circumferential direction is from 15 to 45% of a length of a spacing t between the shoulder lug grooves adjacent in the tire circumferential direction.

Another aspect of the present technology is a pneumatic tire including a tread portion provided with a tread pattern. The tread pattern includes an outer main groove extending in a tire circumferential direction on an outer side of the tire center line in the tire width direction, a plurality of shoulder lug grooves each spaced apart in the tire circumferential direction and provided in a shoulder land portion region on an outer side of the outer main groove in the tire width direction, extending from the outer side in the tire width direction toward the outer main groove and closed in the shoulder land portion region, and a plurality of vertical sipes each connected to each of the shoulder lug grooves, having a narrower width than each of the shoulder lug grooves, and each including a first sipe element and a second sipe element extending from each of the shoulder lug grooves to both directions in the tire circumferential direction, each of the vertical sipes has a depth greater than a groove depth of each of the shoulder lug grooves.

Preferably, each of the vertical sipes is arranged along the tire circumferential direction being discontinued between respective adjacent shoulder lug grooves.

According to the present technology, it is possible to improve high-speed steering stability and suppress a decline in wet steering stability.

DETAILED DESCRIPTION

The pneumatic tire (hereinafter also referred to as a tire) of the present embodiment described below may be applied, for example, to a tire for a light truck or a tire for a truck and a bus, however, may also be applied to a tire for a passenger vehicle such as a taxi tire or the like. The tire according to the embodiment described below is a tire for a light truck. The present embodiment includes various embodiments described below.

Figure 1:
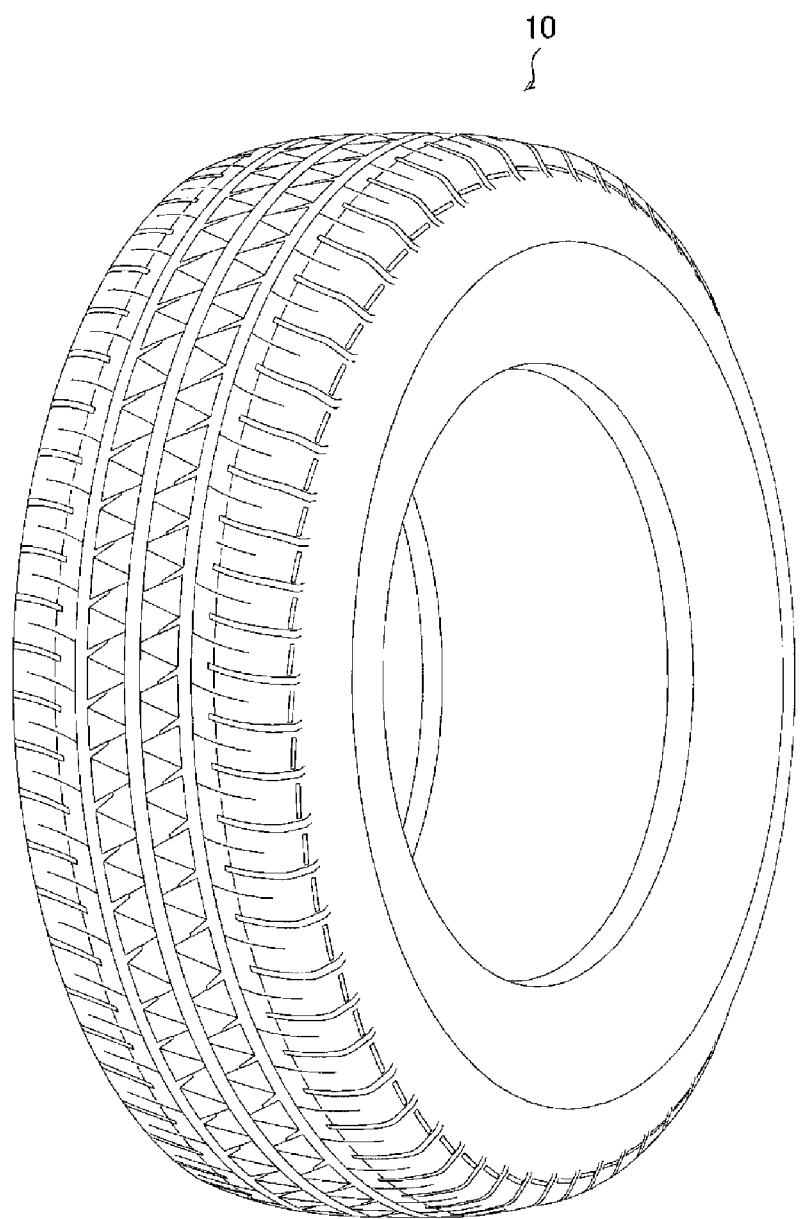
FIG. 1 is a perspective view illustrating an example of an external appearance of a pneumatic tire of the present embodiment.

FIG. 1 is an external perspective view of a tire 10 according to the present embodiment.

The "tire width direction" is the direction parallel with the rotation axis of the tire 10. Outward in the tire width direction is a direction away from the tire center line CL (see FIG. 2) representing the tire equatorial plane in the tire width direction. Also, inward in the tire width direction is a direction closer to the tire centerline CL in the tire width direction. The "tire circumferential direction" is the direction the tire rotates with the rotation axis of the tire as the center of rotation. The "tire radial direction" is the direction orthogonal to the rotation axis of the tire 10. Outward in the tire radial direction is the direction away from the rotation axis. Similarly, inward in the tire radial direction is a direction closer to the rotation axis.

Tire Structure

Figure 2:
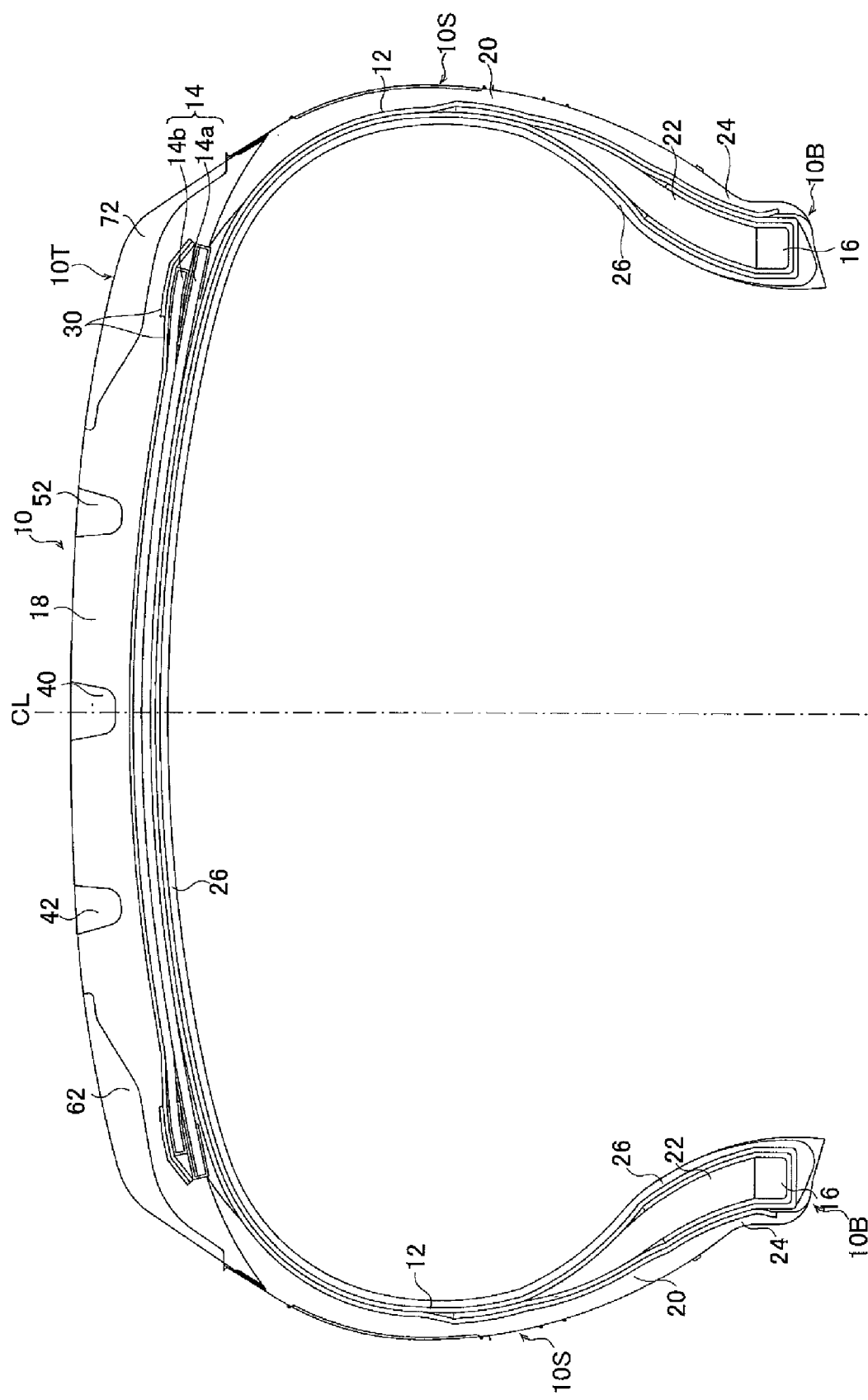
FIG. 2 is a diagram illustrating an example of a profile cross section of the pneumatic tire of the present embodiment.

FIG. 2 is a profile cross-sectional view of the tire 10 of the present embodiment. The tire 10 includes a tread portion 10T including a tread pattern, a pair of bead portions 10B, and a pair of side portions 10S provided on both sides of the tread portion 10T, connecting the pair of bead portions 10B and the tread portion 10T.

The tire 10 mainly includes a carcass ply 12, a belt 14, and a bead core 16 as framework members, and a tread rubber member 18, side rubber members 20, bead filler rubber members 22, rim cushion rubber members 24, and an inner liner rubber member 26 around the framework members.

The carcass ply 12 is made of a carcass ply member that is made of organic fibers covered with rubber and that is wound between a pair of annular bead cores 16 and formed into a toroidal shape. The carcass ply 12 is wound around the bead core 16 and extends outward in the tire radial direction. The belt 14, which is made of two belt members 14a and 14b, is provided on the outside of the carcass ply 12 in the tire radial direction. The belt 14 is made of a member in which rubber is coated on a steel cord arranged inclined at a predetermined angle, for example, at from 20 to 30 degrees with respect to the tire circumferential direction, and the lower belt material 14a is longer in the tire width direction than the upper belt material 14b. The steel cords of the two belt members 14a and 14b are inclined in opposite directions. As such, the belt members 14a and 14b are crossing layers and suppress expansion of the carcass ply 12 due to the pressure of the air in the tire.

A tread rubber member 18 is provided on the outside of the belt 14 in the tire radial direction, and side rubber members 20 are connected to both ends of the tread rubber member 18 forming side portions 10S. The rim cushion rubber members 24 are provided at the inner ends of the side rubber members 20 in the tire radial direction and come into contact with a rim on which the tire 10 is mounted. A bead filler rubber member 22 is provided on the outside of the bead core 16 in the tire radial direction being sandwiched between a portion of the carcass ply 12 before being wound around the bead core 16 and a portion of the carcass ply 12 wound around the bead core 16. The innerliner rubber member 26 is provided on the inner surface of the tire 10 facing a tire cavity region that is inflated with air and is surrounded by the tire 10 and the rim.

In addition, between the belt member 14b and the tread rubber member 18, there is provided a two-layer belt cover 30 that is formed by organic fibers covered with rubber and covers the belt 14 from outside in the tire radial direction of the belt 14.

Tread Pattern

Figure 3:
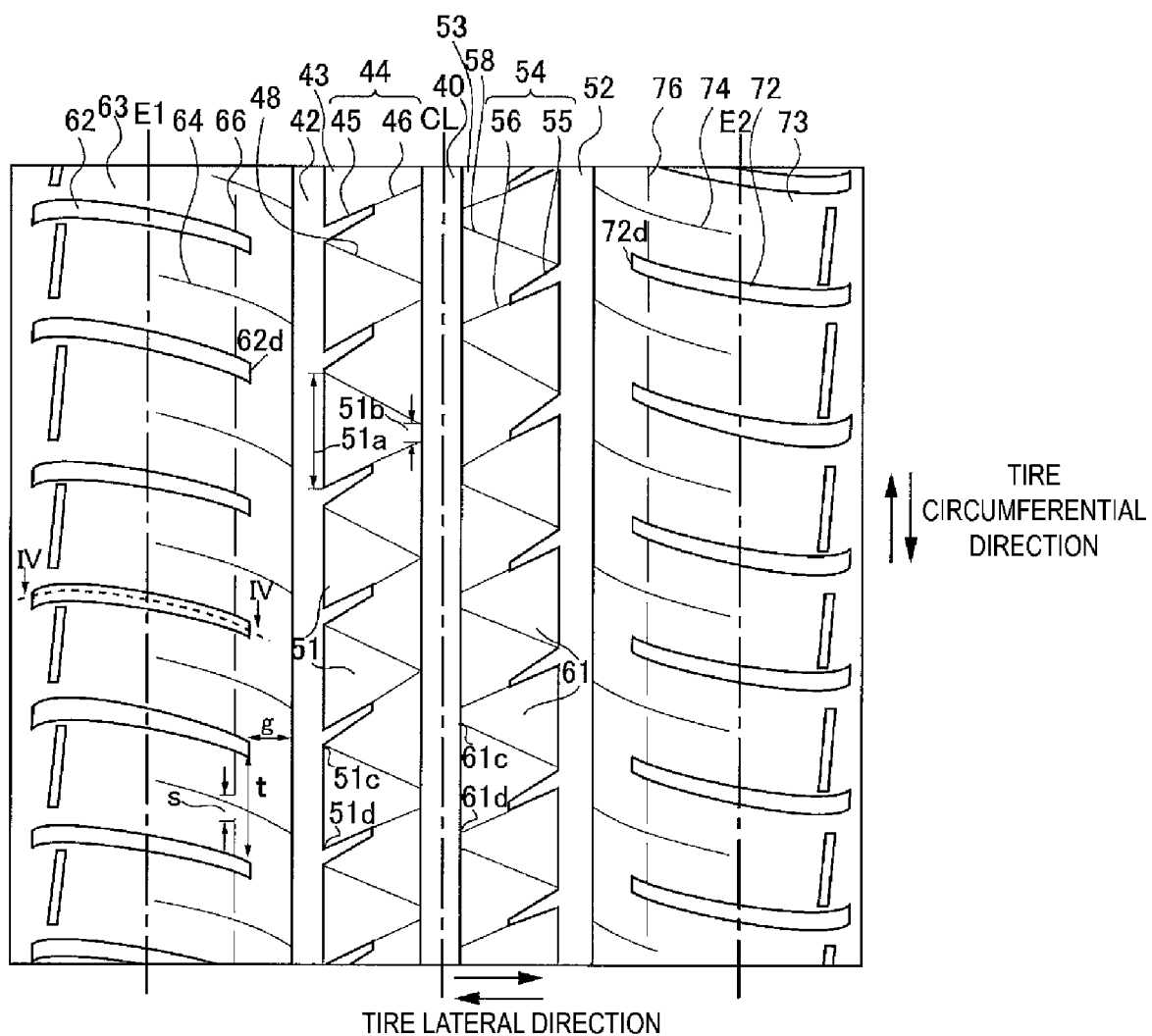
FIG. 3 is a diagram illustrating an example of a tread pattern of the tire in FIG. 2.

FIG. 3 is a diagram illustrating an example of a tread pattern of the tire 10 in FIG. 2.

The tread pattern includes an outer main groove 42, a plurality of shoulder lug grooves 62, and a plurality of vertical sipes 66.

The outer main groove 42 is a groove extending in the tire circumferential direction on the outer side of the tire centerline CL in the tire width direction.

Each of the shoulder lug grooves 62 extends from the outside in the tire width direction toward the outer main groove 42 in a shoulder groove portion 63 on an outer side of the outer main groove 42 in the tire width direction, closes in the shoulder land portion region 63, and are provided spaced apart in the circumferential direction. Due to each of the shoulder lug grooves 62 being closed in the shoulder land portion region 63, a decline in the rigidity of the shoulder land portion is suppressed, the shoulder land portion is unlikely to deform with respect to the lateral direction force, and steering stability when traveling at high speeds (high-speed steering stability) is improved.

According to one embodiment, the outer ends of each of the shoulder lug grooves 62 in the tire width direction is preferably positioned further outward in the tire width direction than the ground contact edge E1 of the tread surface in order to ensure drainage properties.

Note that the ground contact edges are both ends in the tire width direction of the ground contact surface when the tire 10 is assembled on a regular rim, inflated to a regular internal pressure, and is grounded on a horizontal plane under the condition that the load is 88% of the regular load. "Regular rim" refers to an "measuring rim" defined by JATMA (Japan Automobile Tyre Manufacturers Association, Inc.), a "Design Rim" defined by TRA (The Tire and Rim Association, Inc.), or a "Measuring Rim" specified by ETRTO (European Tire and Rim Technical Organization). Additionally, "regular internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "regular load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

Each of the vertical sipes 66 has a sipe width that is narrower than a groove width of each of the shoulder lug grooves 62, crosses each of the shoulder lug grooves 62, and extends in the tire circumferential direction. The sipe depth of each of the vertical sipes 66 is deeper than the groove depth of each of the shoulder lug grooves 62. Since each of the shoulder lug grooves 62 closes, compared with a case where each of the shoulder lug grooves is connected to the outer main groove 42, the groove volume that contributes to the drainage properties is reduced, however, the drainage properties are compensated by each of the vertical sipes 66 that crosses each of the shoulder lug grooves 62, and additionally the depth of each of the vertical sipes 66 is deeper than that of each of the shoulder lug grooves 62, thus the drainage properties are improved. Each of the vertical sipes 66 affects the rigidity of the shoulder land portion, however, each of the vertical sipes 66 is discontinuous in the tire circumferential direction, so compared to a case where each of the vertical sipes 66 is continuous in the tire circumferential direction, the degree of decrease in rigidity is small, and also by closing each of the shoulder lug grooves 62, the rigidity is increased and the high-speed steering stability is improved. In addition, by securing the rigidity, large cornering power may be obtained at the time of turning, and together with an effect of improving drainage, a decrease in wet steering stability is suppressed. In other words, it is possible to improve high-speed steering stability and suppress a decline in wet steering stability.

Note that each of the vertical sipes 66 crossing each of the shoulder lug grooves 62 refers to the case that each of the vertical sipes 66 passes through the closed ends of each of the shoulder lug grooves 62 contacting each of the shoulder lug grooves 62 but not intersecting with each of the shoulder lug grooves 62, or each of the vertical sipes 66 intersect with each of the shoulder lug grooves 62 at portions other than the closed ends of each of the shoulder lug grooves 62.

The sipe depth of each of the vertical sipes 66 being greater than the groove depth of each of the shoulder lug grooves 62, refers to a case that the sipe depth of each of the vertical sipes 66 is greater than the groove depth of each of the shoulder lug grooves 62 at a position where each of the vertical sipes 66 crosses each of the shoulder lug grooves 62. In this case, the sipe depth of each of the vertical sipes 66 is, for example, from 1.5 to 3.0 times the groove depth of each of the shoulder lug grooves 62.

According to an embodiment, each of the vertical sipes 66 is preferably arranged along the tire circumferential direction being discontinued between respective adjacent shoulder lug grooves 62. Preferably, all of the vertical sipes 66 extend in a direction parallel to the tire centerline CL. In this case, each of the vertical sipes 66 are preferably arranged at the same position in the tire width direction. In this case, the tread pattern is preferably further provided with a plurality of shoulder sipes 64 spaced apart in the tire circumferential direction and provided in the shoulder land portion regions 63, each extending crossing between respective vertical sipes 66 that are discontinued. Accordingly, the edge component of each of the shoulder sipes 64 increases in the tire circumferential direction, and wet steering stability on a low μ road surface having a small coefficient of friction, such as a stone-paved road, is improved.

According to an embodiment, each of the shoulder sipes 64 are preferably open to the outer main groove 42. In this case, the sipe depth of the open end of each of the shoulder sipes 64 is preferably raised and shallower than portions other than the open end of each of the shoulder sipes 64.

According to an embodiment, each of the shoulder sipes 64 preferably extends from the closed ends of each of the shoulder lug grooves 62 to the outer side in the tire width direction, or in other words, the region in the tire width direction in which each of the shoulder sipes 64 is located and the region in the tire width direction in which each of the shoulder lug grooves 62 is located preferably overlaps. In this case, the outer ends of each of the shoulder sipes 64 in the tire width direction are preferably positioned further inward in the tire width direction than the ground contact edge E1.

According to an embodiment, the sipe depth of each of the shoulder sipes 64 is preferably less than or equal to the sipe depth of each of the vertical sipes 66 (sipe depth of the shoulder sipe 64≤sipe depth of the vertical sipe 66).

According to an embodiment, the sipe width of each of the vertical sipes 66 is preferably greater than the sipe width of each of the shoulder sipes 64. Drainage properties are improved due to the wide sipe width of each of the vertical sipes 66. The sipe width of each of the vertical sipes 66 is, for example, greater than 1.2 mm and less than or equal to 2 mm, and the sipe width of each of the sipes other than the vertical sipes 66 (including the shoulder sipes 64) is, for example, from 0.8 to 1.2 mm. Note that in FIG. 3, each of the vertical sipes 66 are illustrated by lines similar to the other sipes.

According to an embodiment, the tread pattern preferably further, as will be described below, includes an inner main groove 40, a plurality of lug grooves with sipes 44, and a plurality of second sipes 48, and preferably, in the inner land region 43, a plurality of substantially triangular blocks 51 each are surrounded by the outer main groove 42, each of the lug grooves with sipes 44, and each of the second sipes 48 may be arranged side by side in the tire circumferential direction.

The inner main groove 40 is a groove extending in the tire circumferential direction provided on an inner side of the outer main groove 42 in the tire width direction, and spaced apart from the outer main groove 42. In the example illustrated in FIG. 3, the inner main groove 40 passes through the tire centerline CL.

The lug grooves with sipes 44 are each constituted by each of lug grooves 45 and each of first sipes 46, and are arranged spaced apart in the tire circumferential direction in the inner land portion region 43, and extend through the inner land portion region 43. Each of the lug grooves 45 extends though the inner land region 43 between the outer main groove 42 and the inner main groove 40 from the outer main groove 42 toward the inner main groove 40 and is closed within the inner land portion region 43. Each of the first sipes 46 extends further toward the inner main groove 40 from each of the lug grooves 45. Each of the lug grooves with sipes 44 extend at an incline with respect to the tire width direction. The inclination angle of each of the lug grooves with sipes 44 with respect to the tire width direction is, for example, from 15 to 45°, and preferably from 25 to 35°.

Each of the second sipes 48 is spaced apart in the tire circumferential direction in the inner land portion region 43, and is arranged alternately with each of the lug grooves with sipes 44 in the tire circumferential direction, and extends through the inner land portion region 43. Each of the second sipes 48 extends at an incline with respect to the tire width direction in the opposite direction (upper side in FIG. 3) from the direction in the tire circumferential direction (downward in FIG. 3) on which each of the lug grooves with sipes 44 is inclined. The inclination angle of each of the second sipes 48 with respect to the tire width direction is, for example, from 15 to 45°, and preferably is from 25 to 35°. In the example illustrated in FIG. 3, each of the second sipes 48 is placed apart from each of the first sipes 46, and is connected to each of the lug grooves with sipes 44 at the open end of the lug grooves 45.

The substantially triangular block refers to, when a portion (line segment) of the inner land region 43 between open ends of adjacent lug grooves 45 is defined as a first side 51$a$, and a portion (line segment) of the inner land region 43 in contact with the inner main groove 40 between a second sipe 48 and a lug groove with sipe 44 extending from each of the open ends of adjacent lug grooves 45 is defined as a second side 51$b$, a trapezoidal block surrounded by the first side 51$a$, the second side 51$b$, a second sipe 48, and a lug groove with sipe 44, and the block in which the distance between the second sipe 48 and the lug groove with sipe 44 in the tire circumferential direction decreases as it goes from the outer main groove 42 to the inner main groove 40, and the position in the tire circumferential direction of the second side 51$b$ is within the range in the tire circumferential direction where the first side 51$a$ is located.

In this embodiment, preferably each of the shoulder sipes 64 is further connected to the outer main groove 42, and the opening position of each of the shoulder sipes 64 into the outer main groove 42 is located within a range (a range in the tire circumferential direction excluding both ends) on the inside from both ends in the tire circumferential direction of each of the first sides 51$a$ of the substantially triangular block. The portion of each of the substantially triangular blocks 51 that forms the side being in contact with the outer main groove 42 is a portion in the inner land portion region 43 where the rigidity is high, so by opening each of the shoulder sipes 64 at a position facing this portion, localized reduction in rigidity is suppressed in the land portion regions sandwiching the outer main groove 42. This contributes to improved high-speed steering stability.

In this embodiment, the opening position of each of the shoulder sipes 64 into the outer main groove 42 is more preferably located 5 to 35% of the length of each of the first sides 51$a$ away from the end (lower end in FIG. 3) of each of the first sides 51$a$ in the tire circumferential direction.

Note that in the above embodiment where the substantially triangular blocks 51 are aligned, by aligning each of the substantially triangular blocks 51 in the tire circumferential direction in the inner land portion regions 43 where the lug grooves with sipes 44 are arranged, the effect of suppressing flex of the blocks with respect to external force in any of the tire circumferential direction and the tire width direction received from the road surface when the vehicle is traveling is higher compared with a case where parallelogram-shaped blocks are arranged in the tire circumferential direction. Accordingly, when the vehicle is traveling, the rigidity of the inner land portion region 43 may be prevented from decreasing, and high-speed steering stability may be improved. A parallelogram-shaped block is a block formed in the land portion region when a plurality of lug grooves and sipes extending at an incline to the same direction in the tire circumferential direction with respect to the tire width direction are arranged penetrating the land portion regions and spaced apart in the tire circumferential direction. Such a parallelogram-shaped block is prone to collapsing in both the tire circumferential direction and the tire width direction, and the effect of suppressing a decline in the rigidity of the land portion region is insufficient.

Additionally, in this embodiment, the lug grooves with sipes 44 have lower drainage properties compared to the lug grooves that extend through the land portion regions; however, by including first sipes 46, the rigidity of the inner land portion region 43 is ensured, and thus cornering power obtained when turning is large, and steering stability is high. In the low $\mu$ (path having a low coefficient of friction), it is difficult for a thick water film to form, so even when the drainage properties are reduced, high wet steering stability performance is exhibited due to high steering stability. In this embodiment, by providing lug grooves with sipes 44, the rigidity of the inner land portion region 43 is improved, and wet steering stability on low $\mu$ road surfaces is superior.

Figure 4:
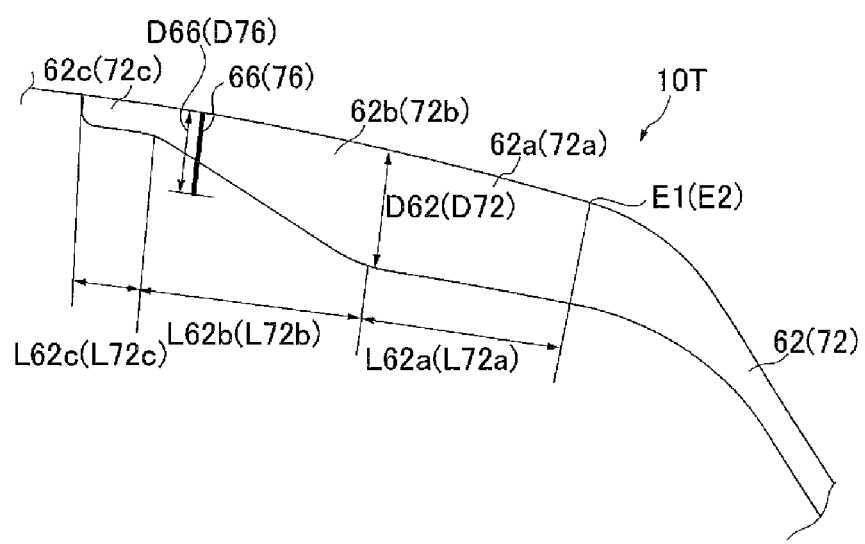
FIG. 4 is a view in the direction of arrows IV-IV in FIG. 3.
Figure 5:
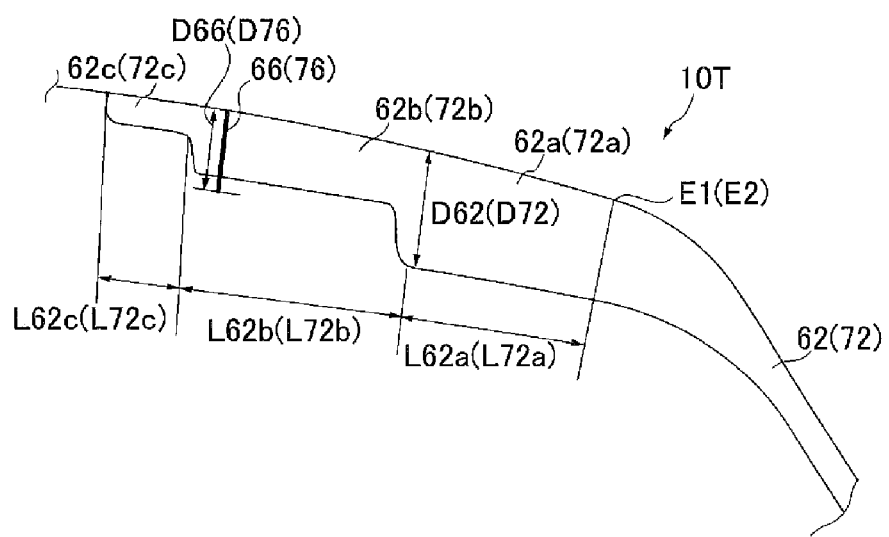
FIG. 5 is a diagram illustrating a modified example of a shoulder lug groove.

FIG. 4 is a view in the direction of arrows IV-IV in FIG. 3, and is a diagram focusing on the shoulder lug groove in FIG. 2. FIG. 5 is a diagram illustrating a modified example of a shoulder lug groove.

According to an embodiment, as illustrated in FIG. 4 and FIG. 5, each of the shoulder lug grooves 62 preferably includes a portion where the groove depth decreases continuously or stepwise shallower from the outer side in the tire width direction toward the outer main groove 42, and the sipe depth of each of the vertical sipes 66 is preferably greater than the groove depth of each of the shoulder lug grooves 62 at a position where each of the vertical sipes 66 crosses each of the shoulder lug grooves 62. Accordingly, the rigidity of the shoulder land portion is secured, and the high-speed steering stability is improved. Due to each of the shoulder lug grooves 62 including the portion where the groove depth decreases shallower, the groove volume of each of the shoulder lug grooves 62 decreases, however, each of the shoulder lug grooves 62 may effectively drain to the outer side in the tire width direction when draining, so a reduction in drainage properties is suppressed. Each of the shoulder lug grooves 62 includes a portion that decreases continuously shallower in the example illustrated in FIG. 4, and each of the shoulder lug grooves 62 includes a portion that decreases stepwise shallower in the example illustrated in FIG. 5.

According to an embodiment, each of the shoulder lug grooves 62 preferably includes a portion (intermediate region) 62b that decreases shallower toward the outer main groove 42 in a position midway in the extension direction, as in the example illustrated in FIG. 4 and FIG. 5. In this case, the lengths L62a, L62b and L62c are respectively, for example, from 45 to 65%, 25 to 45% and from 5 to 25% of the length of a portion of the shoulder lug grooves 62 extending inward in the tire width direction from ground contact edge E1; where L62a is a length along the extending direction of the deep groove region 62a that is further outward in the tire width direction than the middle region 62b, L62b is a length along the intermediate region 62b, and L62c is a length along the shallow groove region 62c that is further inward in the tire width direction than the intermediate region 62b.

According to an embodiment, as illustrated in FIG. 4 and FIG. 5, each of the vertical sipes 66 preferably intersect each of the shoulder lug grooves 62 at the respective intermediate regions 62b. The ground contact pressure is higher on the inner side in the tire width direction, and thus intersecting at intermediate regions 62b increases the edge effect compared to a case of intersecting at the deep groove region 62a.

According to an embodiment, each of the vertical sipes 66 preferably intersects at a position of the shoulder lug groove 62 that is from 20 to 60% of the maximum groove depth D62 of the shoulder lug groove 62. Additionally, according to an embodiment, as illustrated in FIG. 4 and FIG. 5, the sipe depth D66 of each of the vertical sipes 66 is preferably shallower than the maximum groove depth D62 of each of the shoulder lug grooves 62.

According to one embodiment, each of the vertical sipes 66 are preferably shallower than the depth of the outer main groove 42, for example, the depth is from 60 to 90% of the groove depth of the outer main groove 42.

According to an embodiment, as illustrated in FIG. 4 and FIG. 5, in a cross section that includes the rotation axis of the tire 10, each of the vertical sipes 66 preferably extend in a straight line in the depth direction. And thus, drainage properties are improved compared to a case where there is curving or bending in the depth direction. In a case where the shape is curved or zigzagged in the depth direction, the drainage effect decreases.

According to an embodiment, the closed end 62d of each of the shoulder lug grooves 62 is preferably separated from the outer main groove 42 by 5 mm or greater, or in other words, as illustrated in FIG. 3, the spacing g between the closed end 62d and the outer main groove 42 in the tire width direction is preferably less than 5 mm or greater. In a case where the spacing g between the closed end 62d and the outer main groove 42 is less than 5 mm, the rigidity of the shoulder land portion may not be sufficiently ensured with respect to the lateral force, and steering stability will decline. The spacing g is preferably from 7 to 10 mm.

According to an embodiment, as illustrated in FIG. 3, the spacing s between adjacent vertical sipes 66 in the tire circumferential direction is preferably from 15 to 45% of the length of the spacing t between adjacent shoulder lug grooves 62 in the tire circumferential direction. In a case where the spacing s is less than 15% of the spacing t, the rigidity of the shoulder land portion may be reduced, and the high-speed steering stability may decline. In a case where the spacing s exceeds 45% of the spacing t, sufficient drainage effect may not be achieved. Additionally, by setting the spacing s is 45% or less of the spacing t, the edge component in the vertical direction is ensured, and the steering stability when turning is improved. The spacing s is preferably from 20 to 40% of the spacing t.

In the tread pattern of the tire 10, the form of the other regions excluding the shoulder land portion region 63 is not particularly limited. For example, according to an embodiment, as illustrated in FIG. 3, the tread pattern is point symmetric with respect to a point on the tire centerline CL.

Furthermore, as illustrated in FIG. 3, the tread pattern of this embodiment includes an outer main groove 52, a plurality of shoulder lug grooves 72, and a plurality of vertical sipes 76.

Moreover, the tread pattern of the present embodiment, in addition to the form of the inner land portion region 43 described above, is further provided with a plurality of lug grooves with sipes 54 and a plurality of second sipes 58, and in the inner land portion region 53, a plurality of substantially triangular blocks 61 each surrounded by the outer main groove 52, each of the lug grooves with sipes 54, and each of the second sipes 58, are arranged side by side in the tire circumferential direction. In the example illustrated in FIG. 3, the edges 51c and 51d of each of the substantially triangular blocks 51 in the tire circumferential direction described above, and the edges 61c, 61d of each of the substantially triangular blocks 61 in the tire circumferential direction are arranged at different positions in the tire circumferential direction.

The form of the profile cross section of each of the shoulder lug grooves 72 and each of the vertical sipes 76 is the same as that in FIG. 4 or FIG. 5, and the elements of each of the shoulder lug grooves 72 and each of the vertical sipes 76 are represented by reference signs of parentheses in FIG. 4 and FIG. 5.

According to an embodiment, the number of circumferential main grooves is preferably three. The reduction in the rigidity of the inner land portion regions 43 and 53 may be effectively suppressed and steering stability at high speeds may be increased compared to a case where four or more are provided.

Note that in FIG. 2, the lug grooves with sipes 44 and 54, the second sipes 48 and 58, the shoulder sipes 64 and 74, and the vertical sipes 66 and 76 are omitted.

In the tread pattern of the tire 10 described above, in an embodiment, the vertical sipes 66 in a form described below may be employed instead of the vertical sipes 66 in the form described above. In other words, each of the vertical sipes 66 may be vertical sipes including a first sipe element and a second sipe element that are narrower than each of the shoulder lug grooves 62 and extend from each of the shoulder lug grooves 62 on both sides in the tire circumferential direction, and may be connected to each of the shoulder lug grooves. The first sipe element extends to one side in the tire circumferential direction, and the second sipe element extends to the other side in the tire circumferential direction. The connection positions of the first sipe element and the second sipe element with respect to each of the shoulder lug grooves 62 may be placed apart (offset) in the tire width direction, and the amount of displacement, for example, is 2.5 times or less of the width of each of the vertical sipes 66.

COMPARATIVE EXAMPLES, EXAMPLES

In order to examine the effects of the pneumatic tire of the embodiment, the tread pattern of the tire was varied, and the high-speed steering stability and the wet steering stability were examined. The prototype tire was 235/65R16C 115/113R in size and had the cross-sectional shape illustrated in FIG. 2, and the tread pattern was based on the tread pattern illustrated in FIG. 3 except for the forms given in Tables 1 and 2 and described below. Note that, as illustrated in FIG. 4, the vertical sipes extend linearly in the depth direction.

In Table 1 and Table 2, the form of the tread patterns of each of the tires and the evaluation results are given.

In Table 1 and Table 2, a case where each of the shoulder lug grooves is connected to the outer main groove is expressed as "connected", and a case where each of the shoulder lug grooves is closed and not connected is expressed as "closed".

A case where each of the vertical sipes is continuous throughout the entire circumference is expressed as "continuous", and a case where each of the vertical sipes is discontinued between respective adjacent shoulder lug grooves in the tire circumferential direction is expressed as "intermittent".

The deeper one of the shoulder lug groove and the vertical sipe is entered in the row "Depth of Shoulder Lug Groove and Vertical Sipe".

A case where the opening position of the shoulder sipe into the outer main groove is at the same position in the tire circumferential direction as the lower end (vertex) of the first side of the substantially triangular block in the tire circumferential direction is represented as "vertex", and a case where the opening position is at the position illustrated in FIG. 3 is represented as "side".

In regard to the groove depth of the shoulder lug grooves, a case where the groove depth of the region where the intermediate region 63*b* and the shallow groove region 63*c* illustrated in FIG. 4 are the same as that of the deep groove region is represented as "constant", and a case where there is a continuously shallowing portion as illustrated in FIG. 4 is represented as "gradual decrease".

In the "s Range" row, the length of the spacing s between adjacent vertical sipes in the tire circumferential direction is expressed using the length of the spacing t between adjacent shoulder lug grooves in the tire circumferential direction.

The sipe width of each of the vertical sipes was narrower than the groove width of each of the shoulder lug grooves.

In Examples 2 to 5, each of the shoulder sipes is open to the outer main groove, and the sipe depth of each of the open ends is shallower than portions of each of the shoulder sipes other than the open ends. In addition, the sipe width of each of the shoulder sipes was 1.0 mm.

The sipe width of each of the vertical sipes was 1.0 mm in Example 2, and 1.5 mm in the other examples.

High-Speed Steering Stability

The test vehicle was a van with a maximum carrying capacity of 3.5 tons, each test tire was assembled on a rim size 16×61/2J wheel, the air pressure was 300 kPa at the front and 480 kPa at the rear, sensory evaluations of the steering performance, straight traveling performance and the like were performed when a test driver traveled on a dry road test course in the range from 0 to 200 km/h, and the results are indicated as an index with Comparative Example 1 being 100. A higher index indicates better high-speed steering stability. An index of 102 or greater was evaluated as having improved high-speed steering stability.

Wet Steering Stability

Each test tire was mounted on the same test vehicle as that used in the evaluation test of high-speed steering stability, and a test driver traveled on a test course with a wet road surface having a water depth of 1.5 mm or less at speeds in a range from 0 to 80 km/hour, and sensory evaluations of the steering performance, straight running performance, and the like were performed at this time, and the results are indicated as an index with Comparative Example 1 being 100. A higher index indicates better high-speed steering stability. An index of 100 or greater was evaluated as being able to suppress a decline in wet steering stability.

TABLE 1

|  | Comparative Example 1 | Comparative Example 2 | Comparative Example 3 | Comparative Example 4 | Example 1 |
| --- | --- | --- | --- | --- | --- |
| Shoulder lug groove | Connected | Connected | Closed | Closed | Closed |
| Vertical sipe | Continuous | Intermittent | Continuous | Intermittent | Intermittent |
| Depth of shoulder lug groove and vertical sipe | Shoulder lug groove | Vertical sipe | Vertical sipe | Shoulder lug groove | Vertical sipe |
| Presence of shoulder sipes | No | No | No | No | No |
| Width of vertical sipe and shoulder sipe | — | — | — | — | — |
| Shoulder sipe opening position | — | — | — | — | — |
| Groove depth of shoulder lug groove | Constant | Constant | Constant | Constant | Constant |
| Spacing between shoulder lug groove and main groove | 7 [mm] | 7 [mm] | 7 [mm] | 7 [mm] | 7 [mm] |
| Range of s | 0.2 [t] | 0.2 [t] | 0.2 [t] | 0.2 [t] | 0.2 [t] |
| High-speed Steering Stability | 100 | 100 | 101 | 103 | 103 |
| Wet steering stability | 100 | 100 | 100 | 99 | 100 |

TABLE 2

|  | Example 2 | Example 3 | Example 4 | Example 5 |
|---|---|---|---|---|
| Shoulder lug groove | Closed | Closed | Closed | Closed |
| Vertical sipe | Intermittent Vertical sipe | Intermittent Vertical sipe | Intermittent Vertical sipe | Intermittent Vertical sipe |
| Depth of shoulder lug groove and vertical sipe |  |  |  |  |
| Presence of shoulder sipes | Yes | Yes | Yes | Yes |
| Width of vertical sipe and shoulder sipe | Equal | Vertical sipe | Vertical sipe | Vertical sipe |
| Shoulder sipe opening position | Vertex | Vertex | Side | Side |
| Groove depth of Shoulder lug groove | Constant | Constant | Constant | Gradual decrease |
| Spacing between shoulder lug groove and main groove | 7 [mm] | 7 [mm] | 7 [mm] | 7 [mm] |
| Range of s | 0.2 [t] | 0.2 [t] | 0.2 [t] | 0.2 [t] |
| High-speed Steering Stability | 102 | 102 | 103 | 105 |
| Wet steering stability | 101 | 102 | 102 | 102 |

From a comparison of Examples 1 to 9 and Comparative Examples 1 to 4, it can be seen that steering stability at high speeds is improved and the decline in wet steering stability is suppressed due to the shoulder lug grooves being closed, the vertical sipes being intermittent, and the sipe depth of the vertical sipes being greater than the groove depth of the shoulder lug grooves. From a comparison of Example 1 and Example 2, it can be seen that wet steering stability is improved by providing shoulder sipes.

From a comparison of Example 2 and Example 3, it can be seen that the wet steering stability is further improved due to the width of the vertical sipes being wider than the width of the shoulder sipes.

From a comparison between Example 3 and Example 4, it can be seen that the high-speed steering stability is improved due to the opening position of the shoulder sipes being located in a side of the substantially triangular block.

From a comparison of Example 4 and Example 5, it can be seen that steering stability at high speeds is particularly improved by including a portion where the groove depth of the shoulder lug grooves decreases continuously or stepwisely shallower.

The foregoing has been a detailed description of the pneumatic tire according to embodiments of the present technology. However, the pneumatic tire according to an embodiment of the present technology is not limited to the above embodiments or examples, and may of course be enhanced or modified in various ways within the scope of the present technology.

The invention claimed is:

1. A pneumatic tire comprising a tread portion provided with a tread pattern; wherein
   the tread pattern comprises
   an outer main groove extending in a tire circumferential direction on an outer side of a tire center line in a tire width direction,
   a plurality of shoulder lug grooves each spaced apart in the tire circumferential direction and provided in a shoulder land portion region on an outer side of the outer main groove in the tire width direction, extending from the outer side in the tire width direction toward the outer main groove and closed in the shoulder land portion region, and
   a plurality of vertical sipes each connected to each of the shoulder lug grooves and being discontinuous between adjacent of the shoulder lug grooves, having a narrower width than each of the shoulder lug grooves, and each comprising a first sipe element and a second sipe element extending from each of the shoulder lug grooves to both directions in the tire circumferential direction, and
   each of the vertical sipes has a depth greater than a groove depth of each of the shoulder lug grooves, wherein
   each of the shoulder lug grooves comprises a portion where the groove depth decreases continuously or stepwisely shallower from the outer side in the tire width direction toward the outer main groove, and
   the sipe depth of each of the vertical sipes is greater than the groove depth of each of the shoulder lug grooves at a position where each of the vertical sipes crosses each of the shoulder lug grooves and the sipe depth of each of the vertical sipes is shallower than a maximum groove depth of each of the shoulder lug grooves.

2. The pneumatic tire according to claim 1, wherein the groove depth of each of the shoulder lug grooves at the position is from 20% to 60% of the maximum groove depth of each of the shoulder lug grooves.

3. A pneumatic tire comprising a tread portion provided with a tread pattern, wherein
   the tread pattern comprises
   an outer main groove extending in a tire circumferential direction on an outer side of the tire center line in a tire width direction,
   a plurality of shoulder lug grooves each spaced apart in the tire circumferential direction and provided in a shoulder land portion region on an outer side of the outer main groove in the tire width direction, extending from the outer side in the tire width direction toward the outer main groove and closed in the shoulder land portion region, and
   a plurality of vertical sipes each having a narrower width than each of the shoulder lug grooves, and extending in the tire circumferential direction, crossing each of the shoulder lug grooves and being discontinuous between adjacent of the shoulder lug grooves, and
   each of the vertical sipes having a depth greater than a groove depth of each of the shoulder lug grooves, wherein
   each of the shoulder lug grooves comprises a portion where the groove depth decreases continuously or stepwisely shallower from the outer side in the tire width direction toward the outer main groove, and
   the sipe depth of each of the vertical sipes is greater than the groove depth of each of the shoulder lug grooves at a position where each of the vertical sipes crosses each of the shoulder lug grooves and the sipe depth of each of the vertical sipes is shallower than a maximum groove depth of each of the shoulder lug grooves.

4. The pneumatic tire according to claim 3, wherein, in a cross section comprising a rotation axis of the pneumatic tire, each of the vertical sipes extends linearly in a depth direction.

5. The pneumatic tire according to claim 3, wherein, a closed end of each of the shoulder lug grooves is separated from the outer main groove by 5 mm or greater.

6. The pneumatic tire according to claim 3, wherein the groove depth of each of the shoulder lug grooves at the position is from 20% to 60% of the maximum groove depth of each of the shoulder lug grooves.

7. The pneumatic tire according to claim 3, wherein a spacing s between the vertical sipes adjacent in the tire circumferential direction is from 15 to 45% of a length of a spacing t between the shoulder lug grooves adjacent in the tire circumferential direction.

8. The pneumatic tire according to claim 7, wherein the spacing s is 40% or less of the length of the spacing t.

9. The pneumatic tire according to claim 3, wherein the tread pattern further comprises a plurality of shoulder sipes each spaced apart in the tire circumferential direction and provided in the shoulder land portion region and extending crossing between each of the vertical sipes that are discontinued.

10. The pneumatic tire according to claim 9, wherein the tread pattern further comprises
an inner main groove provided on an inner side of the outer main groove in the tire width direction spaced apart from the outer main groove, and extending in the tire circumferential direction,
a plurality of lug grooves with sipes each formed of a lug groove and a first sipe in an inner land portion region between the outer main groove and the inner main groove, the lug groove extending from the outer main groove toward the inner main groove and closing within the inner land portion region, and the first sipe further extending from the lug groove toward the inner main groove, each of the lug grooves with sipes being arranged in the inner land portion region spaced apart in the tire circumferential direction and extending penetrating through the inner land portion region, and
a plurality of second sipes each arranged alternately in the tire circumferential direction with each of the lug grooves with sipes spaced apart in the tire circumferential direction in the inner land portion region and extending penetrating through the inner land portion region,
each of the lug grooves with sipes extends at an incline with respect to the tire width direction,
each of the second sipes extends at an incline with respect to the tire width direction to a direction opposite to a direction in the tire circumferential direction where each of the lug grooves with sipes is inclined,
in the inner land portion region, a plurality of substantially triangular blocks each surrounded by the outer main groove, each of the lug grooves with sipes, and each of the second sipes are arranged side by side in the tire circumferential direction,
each of the shoulder sipes is connected to the outer main groove, and
an opening position of each of the shoulder sipes into the outer main groove is located within a range in between both ends in the tire circumferential direction where a portion of each of the substantially triangular blocks contacting the outer main groove is located.

11. The pneumatic tire according to claim 10, wherein, when a portion of the inner land portion region between open ends of adjacent lug grooves is defined as a first side, and a portion of the inner land portion region in contact with the inner main groove between the second sipe and the lug groove with sipe extending from each of the open ends of the adjacent lug grooves is defined as a second side, the substantially triangular block is a trapezoidal block surrounded by the first side, the second side, a second sipe, and a lug groove with sipe.

12. The pneumatic tire according to claim 11, wherein the block in which the distance between the second sipe and the lug groove with sipe in the tire circumferential direction decreases as it goes from the outer main groove to the inner main groove.

13. The pneumatic tire according to claim 11, wherein a position in the tire circumferential direction of the second side is within the range in the tire circumferential direction where the first side is located.

14. The pneumatic tire according to claim 11, wherein groove walls of the inner main groove extend in straight lines in the tire circumferential direction.

15. The pneumatic tire according to claim 9, wherein a sipe width of each of the vertical sipes is greater than a sipe width of each of the shoulder sipes.

16. The pneumatic tire according to claim 15, wherein the tread pattern further comprises
an inner main groove provided on an inner side of the outer main groove in the tire width direction spaced apart from the outer main groove, and extending in the tire circumferential direction,
a plurality of lug grooves with sipes each formed of a lug groove and a first sipe in an inner land portion region between the outer main groove and the inner main groove, the lug groove extending from the outer main groove toward the inner main groove and closing within the inner land portion region, and the first sipe further extending from the lug groove toward the inner main groove, each of the lug grooves with sipes being arranged in the inner land portion region spaced apart in the tire circumferential direction and extending penetrating through the inner land portion region, and
a plurality of second sipes each arranged alternately in the tire circumferential direction with each of the lug grooves with sipes spaced apart in the tire circumferential direction in the inner land portion region and extending penetrating through the inner land portion region,
each of the lug grooves with sipes extends at an incline with respect to the tire width direction,
each of the second sipes extends at an incline with respect to the tire width direction to a direction opposite to a direction in the tire circumferential direction where each of the lug grooves with sipes is inclined,
in the inner land portion region, a plurality of substantially triangular blocks each surrounded by the outer main groove, each of the lug grooves with sipes, and each of the second sipes are arranged side by side in the tire circumferential direction,
each of the shoulder sipes is connected to the outer main groove, and
an opening position of each of the shoulder sipes into the outer main groove is located within a range in between both ends in the tire circumferential direction where a portion of each of the substantially triangular blocks contacting the outer main groove is located.

17. The pneumatic tire according to claim 16, wherein, in a cross section comprising a rotation axis of the pneumatic tire, each of the vertical sipes extends linearly in a depth direction.

18. The pneumatic tire according to claim 17, wherein, a closed end of each of the shoulder lug grooves is separated from the outer main groove by 5 mm or greater.

19. The pneumatic tire according to claim 18, wherein a spacing s between the vertical sipes adjacent in the tire circumferential direction is from 15 to 45% of a length of a spacing t between the shoulder lug grooves adjacent in the tire circumferential direction.

\* \* \* \* \*